(12) United States Patent
Odendahl

(10) Patent No.: US 7,730,789 B2
(45) Date of Patent: Jun. 8, 2010

(54) DEVICE AND METHOD FOR MEASURING A GAP BETWEEN MEMBERS OF A STRUCTURE FOR MANUFACTURE OF A SHIM

(75) Inventor: David J. Odendahl, Bothell, WA (US)

(73) Assignee: Boeing Management Company, Seattle, WA (US)

( * ) Notice: Subject to any disclaimer, the term of this patent is extended or adjusted under 35 U.S.C. 154(b) by 736 days.

(21) Appl. No.: 11/555,315

(22) Filed: Nov. 1, 2006

(65) Prior Publication Data

US 2008/0110275 A1    May 15, 2008

(51) Int. Cl.
*G01B 7/16* (2006.01)
(52) U.S. Cl. .................................... 73/780; 73/862.626
(58) Field of Classification Search .................. 73/780, 73/862.626
See application file for complete search history.

(56) References Cited

U.S. PATENT DOCUMENTS

| 4,820,972 | A | * | 4/1989 | Scott et al. ................. 324/687 |
|---|---|---|---|---|
| 4,841,224 | A | | 6/1989 | Chalupnik |
| 4,848,137 | A | | 7/1989 | Turner |
| 5,097,216 | A | * | 3/1992 | Dimmick et al. ............ 324/671 |
| 5,225,959 | A | * | 7/1993 | Stearns .................... 361/283.1 |
| 5,233,291 | A | * | 8/1993 | Kouno et al. ................ 324/765 |
| 5,385,050 | A | | 1/1995 | Roberts |
| 6,106,671 | A | * | 8/2000 | Heaven et al. .............. 162/198 |
| 6,441,629 | B1 | * | 8/2002 | Khoury et al. .............. 324/757 |
| 6,545,495 | B2 | * | 4/2003 | Warmack et al. ........... 324/762 |
| 6,567,061 | B1 | * | 5/2003 | Bolotski et al. ............... 345/89 |
| 6,820,493 | B1 | * | 11/2004 | Bonin ......................... 73/780 |
| 7,084,643 | B2 | * | 8/2006 | Howard et al. .............. 324/663 |

* cited by examiner

*Primary Examiner*—Max Noori
(74) *Attorney, Agent, or Firm*—Weiss & Moy, P.C.

(57) ABSTRACT

An apparatus for measuring a gap between a first mating surface of a first component and a second mating surface of a second component has a substrate. A plurality of capacitive sensors is coupled to the substrate. A controller is coupled to the plurality of capacitive sensors. The controller is used to select each individual capacitive sensor to measure the gap between the first mating surface of the first component and the second mating surface of the second component.

13 Claims, 3 Drawing Sheets

DEVICE AND METHOD FOR MEASURING A GAP BETWEEN MEMBERS OF A STRUCTURE FOR MANUFACTURE OF A SHIM

BACKGROUND OF THE INVENTION

1. Field of the Invention

This invention relates generally to a measurement device and, more specifically, to a device and method to measure a gap between two members of a mechanical structure to enable manufacture of a shim for insertion between the two structural members.

2. Background of the Invention

Many mechanical structures are manufactured by forming component parts of the structure followed by an assembly of the parts to produce the structure. During the assembly process, it may be necessary to introduce a shim between the interfacing surfaces of the component parts. A shim is a thin slip or wedge of metal, wood, etc., for placing into crevices, as between machine parts to compensate for wear or to achieve a certain alignment of the parts.

Presently, when the component parts are moved into their final positions, the gaps between the parts are measured using either feeler gauges or capacitive gap measuring instrumentation. The measurement data is sent to a Computer Numerical Control (CNC) machine tool which manufactures the shims. The manufactured shims are then installed, and final "pull-up" tolerances are checked before the mating components are finally fastened together.

The present method becomes impractical when applied to composite aircraft. This is especially true for composite aircraft having any of the following characteristics: a large quantity of shims need to be produced; the shims have a large surface area; shim materials are difficult to machine such as composites, titanium, and the like; denser data collection requirements such as tighter pull-up tolerances, mating surfaces are not necessarily planar, unknown level of allowable surface distortion, and the like; and measurement access is difficult for the mechanic to access.

The above requirements make the manual measurement of gap data impractical. The fact that the measurement must take place after the components are in place means that even with CNC machines installed on the final integration floor, there will be at least four hours "dead time" during final integration.

Furthermore, in present devices and methods, only one sensor is used. This sensor is manually positioned and individual data points are collected. This becomes impractical when a large number of points must be collected, due to the manual labor required as well as the difficulty in accurately positioning the sensor.

Clearly, there is large benefit in improving gap measurement and accuracy. There is an even greater benefit in allowing the measurement to take place before final systems integration takes place. This would allow the appropriate shims to be manufactured in advance. This would eliminate the "dead time" and "Just-In-Time" shim manufacturing requirements. It would also reduce process flow and allow shim manufacturing operations to be moved to a remote site.

Therefore, a need exists for a system and method that overcomes the problems associated with the prior art.

SUMMARY OF THE INVENTION

An apparatus for measuring a gap between a first mating surface of a first component and a second mating surface of a second component has a substrate. A plurality of capacitive sensors is coupled to the substrate. A controller is coupled to the plurality of capacitive sensors. The controller is used to select each individual capacitive sensor to measure the gap between the first mating surface of the first component and the second mating surface of the second component.

A method for measuring a gap between a first mating surface of a first component and a second mating surface of a second component comprising: providing a gap measurement device comprising: a flexible substrate; a plurality of capacitive sensors coupled to the flexible substrate; and a controller coupled to the plurality of capacitive sensors to select each individual capacitive sensor; coupling a planar reference to known reference points on the first mating surface of the first component; coupling the gap measurement device to an initial position on the planar reference, the plurality of capacitive sensors directed towards the first mating surface of the first component; measuring data from the plurality of capacitive sensors for a gap between the planar reference and the first mating surface of the first component; coupling the planar reference to known reference points on the second mating surface of the second component; coupling the gap measurement device to an initial position on the planar reference, the plurality of capacitive sensors directed towards the second mating surface of the second component; and measuring data from the plurality of capacitive sensors for a gap between the planar reference and the second mating surface of the second component.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
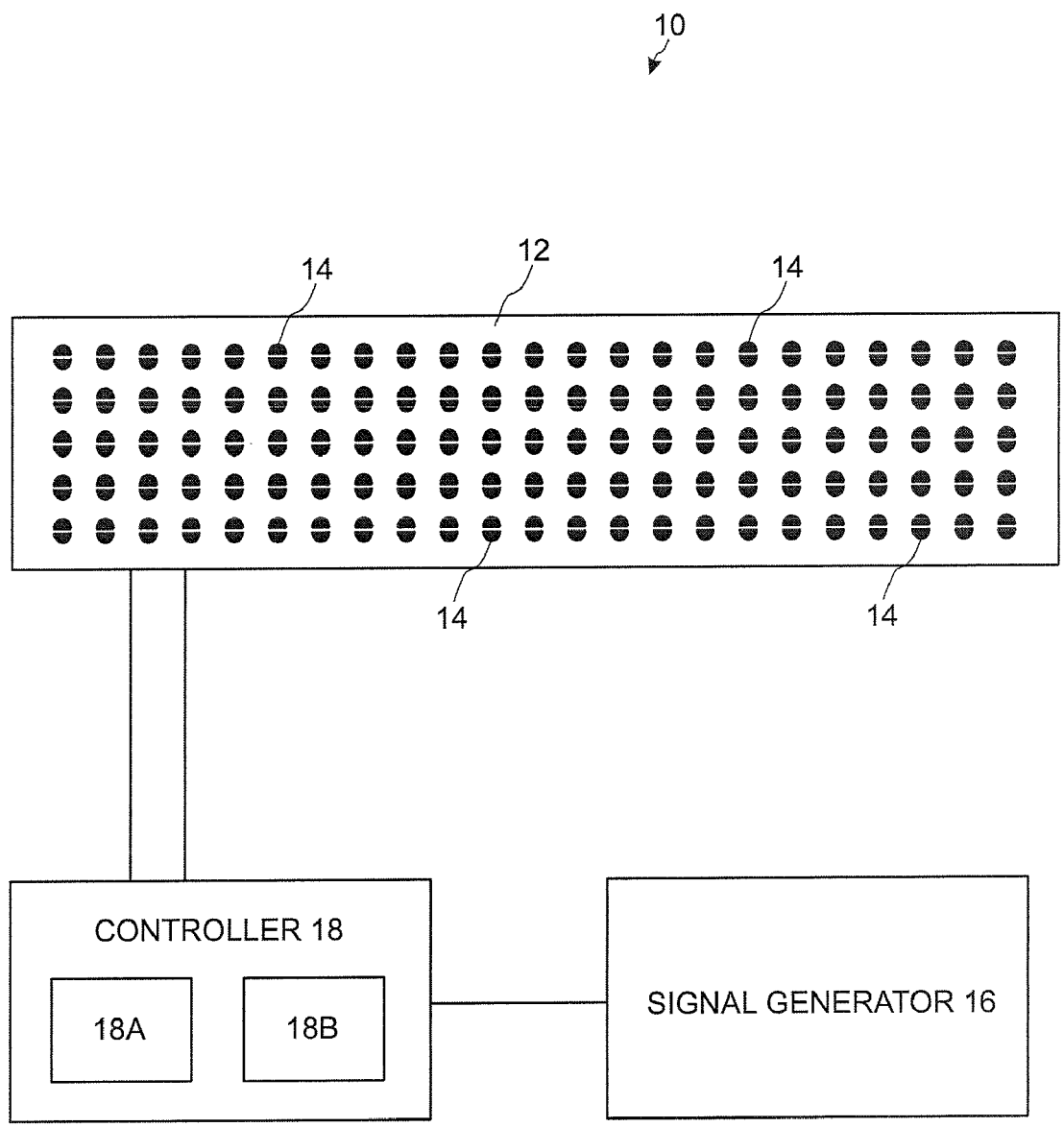
FIG. 1 is simplified functional block diagram of a shim gap measuring tool of the present invention.

Referring to FIGS. 1, a shim gap measurement device 10 is shown (hereinafter device 10). The device 10 has a substrate 12. The substrate 12 is generally a flexible substrate 12. The flexible substrate 12 will allow the device 10 to conform to surfaces that are contoured and not planar. The flexible substrate 12 may be a printed circuit board (PCB), a flexible tape such as a polayamide, and the like.

A plurality of capacitive sensors 14 are coupled to the flexible substrate 12. The capacitive sensors 14 are placed along the surface of the flexible substrate 12. In accordance with one embodiment of the present invention, the plurality of capacitive sensors 14 are arranged in an X-Y matrix. By placing a plurality of capacitive sensors 14 in an X-Y matrix, the device 10 will be able to measure a plurality of points along a surface to be measured thus having a tighter point density. This will allow the device 10 to be more accurate.

Each capacitive sensor 14 generally comprises two conductive plates, which are electrically insulated from one another. The two plates of each capacitive sensor 14 may be arranged in a radial manner (one inside the other), or in parallel as depicted in the Figures. This may reduce any directional variability of the gap sensing. In general, the conductive plates are made out of copper. However, other materials may be used without departing from the spirit and scope of the present invention.

An oscillator 16 will supply a high frequency signal which is placed on the capacitive sensors 14. By measuring the capacitance between the capacitive sensor 14 and a proximate surface of an object, the capacitive sensor 14 generates a signal that is indicative of a gap between the capacitive sensor 14 and the surface of the object.

The plurality of capacitive sensors 14 are coupled together in a matrix format. A controller 18 is used to select each individual capacitive sensor 14 sequentially. In accordance with one embodiment of the present invention, the controller 18 is a plurality of multiplexers. The multiplexers are used to select each individual capacitive sensor 14. A first multiplexer 18A is provided and is used for controlling selection of the plurality of capacitive sensors along an X-axis. A second multiplexer 18B is also provided and is used for controlling selection of the plurality of capacitive sensors along a Y-axis. By using the multiplexers 18A and 18B, one may select each individual capacitive sensor 14 sequentially. The gap at each capacitive sensor location is determined by measuring the capacitance between the two plates of the capacitive sensor 14.

Prior to use, a baseline capacitance value is established for each capacitive sensor 14. In operation, once the sensor data has been captured, the baselines are used to adjust the values to nominal. Once adjusted, the sensor data is output in the form of a simple text file.

Figure 2:
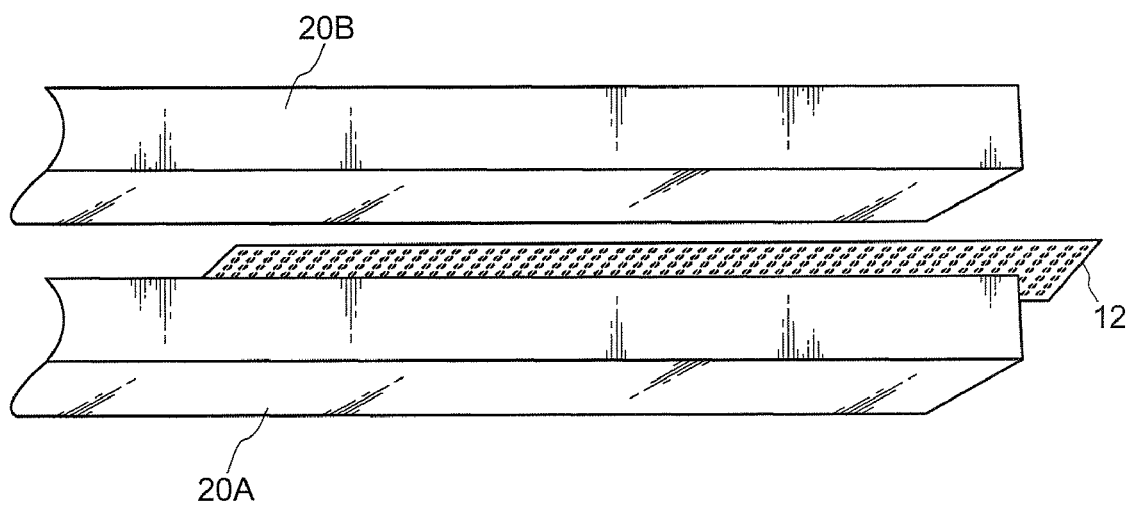
FIG. 2 is a perspective view of the shim gap measuring tool of the present invention measuring a gap between component parts being coupled together.

Referring to FIG. 2, one method for using the device 10 will be disclosed. In the above scenario, the device 10 is positioned between the mating surfaces of two components 20A and 20B. The surfaces of the two components 20A and 20B have already been brought together in the correct relationship to each other. The device 10 is laid on the mating surface of the component 20A so that the capacitive sensors 14 are directed towards the mating surface of the component 20B. The controller 18 is used to select each individual capacitive sensor 14 sequentially. The gap at each capacitive sensor location is determined by measuring the capacitance between the two plates of the capacitive sensor 14. If the mating surfaces of two components 20A and 20B are larger than the surface area of the device 10, the data from the previous measurement is indexed. The device 10 is the repositioned to a new area between the mating surfaces of the two components 20A and 20B that has not been measured. This allows the device 10 to measure additional mating surfaces of two components 20A and 20B not measured in the previous measurement. The gap at each capacitive sensor at the new location is again determined by measuring the capacitance between the two plates of the capacitive sensor 14. All of the gap data is compiled and sent to the machine tool which manufactures the shim. It should be noted that some data processing must take place before the gap data is converted into a useful format for the machine tool. The algorithms used in this data processing are generally well know and widely available commercially. The manufactured shim is then installed, and final "pull-up" tolerances are checked before the mating components are finally fastened together. The present scenario increases the potential data point density and position accuracy. However, it still requires that the shim be manufactured "Just-In Time" at final systems integration.

Figure 3:
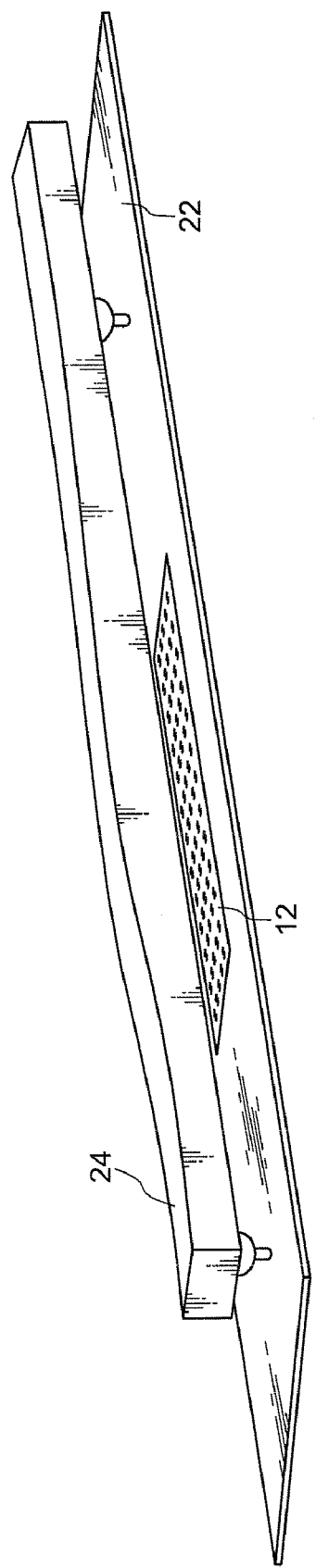
FIG. 3 is a perspective view of the shim gap measuring tool of the present invention measuring a surface of a component prior to final integration.

Referring to FIG. 3, another method for using the device 10 will be disclosed. In the present method, measurement would take place prior to final integration. This would eliminate the "dead time" and "Just-In-Time" shim manufacturing requirements. In the method shown in FIG. 3, a planar reference 22 is attached to known reference points on the surface of a component 24 to be measured. Measurement then proceeds as in the previous scenario. The controller 18 is used to select each individual capacitive sensor 14 sequentially. The gap at each capacitive sensor location is determined by measuring the capacitance between the two plates of the capacitive sensor 14. However, the data collected represents the gap between the planar reference 22 and the surface of a component 24. The same above steps would then be performed on a second component to be mated with the component 24. The planar reference 22 is attached to known reference points on the surface of the second component to be measured. The controller 18 is used to select each individual capacitive sensor 14 sequentially. The gap at each capacitive sensor location is determined by measuring the capacitance between the two plates of the capacitive sensor 14. The data taken from mating surfaces of the component 24 the second component is then merged to develop the final shim thickness profile. The final shim thickness profile data is sent to the machine tool which manufactures the shim. The manufactured shim is then installed, and final "pull-up" tolerances are checked before the mating components are finally fastened together. This scenario provides the greatest benefit as it allows shims to be measured and manufactured before final integration.

It should be noted that in the method disclosed above for FIG. 3, if the surface area of the mating surface of the component 24 is larger than the surface area of the device 10, the device 10 is repositioned to a new area between the planar reference 22 and the surface of the component part 24. The gap at each capacitive sensor at the new location is again determined by measuring the capacitance between the two plates of the capacitive sensor 14. The above steps would also be performed if the surface area of the mating surface of the second component is larger than the surface area of the device 10. The device 10 is repositioned to a new area between the planar reference 22 and the surface of the second component part. The gap at each capacitive sensor at the new location is again determined by measuring the capacitance between the two plates of the capacitive sensor 14. All of the gap data is compiled and sent to the machine tool which manufactures the shim.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A method for measuring a gap between a first mating surface of a first component and a second mating surface of a second component comprising:
   providing a gap measurement device comprising:
   a flexible substrate;
   a plurality of capacitive sensors coupled to the flexible substrate; and
   a controller coupled to the plurality of capacitive sensors to select each individual capacitive sensor;
   coupling a planar reference to known reference points on the first mating surface of the first component;

coupling the gap measurement device to an initial position on the planar reference, the plurality of capacitive sensors directed towards the first mating surface of the first component; and measuring data from the plurality of capacitive sensors.

2. The method of claim 1 further comprising transmitting the data from the plurality of capacitive sensors to a machine tool to manufacture a shim.

3. The method of claim 1 wherein measuring data from the plurality of capacitive sensors comprises selecting each individual capacitive sensor sequentially by the controller to measure data from the plurality of capacitive sensors.

4. The method of claim 1 further comprising arranging the plurality of capacitive sensors in an X-Y matrix.

5. The method of claim 1 further comprising:
adjusting a position of the gap measurement device to the first surface of the first component if the surface area of the first mating surface and the second mating surface is larger than the flexible substrate; and
measuring data from the plurality of capacitive sensors in the adjusted position.

6. The method of claim 5 further comprising compiling all data transmitted from the plurality of capacitive sensors from the initial position and the adjusted position.

7. The method of claim 5 further comprising transferring the compiled data to a tooling machine to manufacture a shim.

8. A method for measuring a gap between a first mating surface of a first component and a second mating surface of a second component comprising:
providing a gap measurement device comprising:
a flexible substrate;
a plurality of capacitive sensors coupled to the flexible substrate; and
a controller coupled to the plurality of capacitive sensors to select each individual capacitive sensor;
coupling a planar reference to known reference points on the first mating surface of the first component;
coupling the gap measurement device to an initial position on the planar reference, the plurality of capacitive sensors directed towards the first mating surface of the first component;
measuring data from the plurality of capacitive sensors for a gap between the planar reference and the first mating surface of the first component;
coupling the planar reference to known reference points on the second mating surface of the second component;
coupling the gap measurement device to an initial position on the planar reference, the plurality of capacitive sensors directed towards the second mating surface of the second component; and
measuring data from the plurality of capacitive sensors for a gap between the planar reference and the second mating surface of the second component.

9. The method of claim 8 further comprising:
compiling the measurement data from the gap between the planar reference and the first mating surface of the first component and the gap between the planar reference and the second mating surface of the second component; and
transmitting the compiled measurement data to a machine tool to manufacture a shim.

10. The method of claim 8 wherein measuring data from the plurality of capacitive sensors for a gap between the planar reference and the first mating surface of the first component further comprises selecting each individual capacitive sensor sequentially by the controller to measure data from the plurality of capacitive sensors.

11. The method of claim 10 wherein measuring data from the plurality of capacitive sensors for a gap between the planar reference and the second mating surface of the second component further comprises selecting each individual capacitive sensor sequentially by the controller to measure data from the plurality of capacitive sensors.

12. The method of claim 8 further comprising:
adjusting a position of the gap measurement device to the planar reference if the surface area of the first mating surface is larger than the flexible substrate; and
measuring data from the plurality of capacitive sensors for a gap between the planar reference and the first mating surface of the first component.

13. The method of claim 8 further comprising:
adjusting a position of the gap measurement device to the planar reference if the surface area of the second mating surface is larger than the flexible substrate; and
measuring data from the plurality of capacitive sensors for a gap between the planar reference and the second mating surface of the second component.

* * * * *